United States Patent [19]

Fisk

[11] 4,053,394
[45] Oct. 11, 1977

[54] PROCESS FOR SEPARATING AND CONVERTING WASTE INTO USEABLE PRODUCTS

[76] Inventor: Pliny Fisk, Amazon Road & Dale St., Mohegan Lake, N.Y. 10547

[21] Appl. No.: 672,876

[22] Filed: Apr. 2, 1976

Related U.S. Application Data

[60] Continuation of Ser. No. 462,132, April 18, 1974, abandoned, which is a division of Ser. No. 343,855, March 22, 1973, Pat. No. 3,847,803.

[51] Int. Cl.² .......................... C02C 1/08; C05F 7/00
[52] U.S. Cl. ............................................. 210/8; 71/9; 71/10; 71/13; 71/24; 71/64 DC; 210/10; 210/11; 210/16; 210/18; 210/64; 210/67; 210/71
[58] Field of Search ................... 21/54 R; 23/259.1; 71/8–10, 12–14, 24, 64 DC; 210/4–8, 10, 14, 15, 16, 63 R, 64, 66, 67, 71, 11, 18

[56] References Cited

U.S. PATENT DOCUMENTS

| | | | |
|---|---|---|---|
| 39,472 | 8/1863 | Fitts | 71/10 |
| 1,029,378 | 6/1912 | Lawton | 71/12 X |
| 1,123,414 | 1/1915 | Smith | 71/13 |
| 1,617,014 | 2/1927 | Derleth | 71/9 X |
| 2,797,985 | 7/1957 | Larson | 71/8 |
| 2,877,599 | 3/1959 | Hebestreet et al. | 71/24 X |
| 3,236,605 | 2/1966 | Pierson | 23/259.1 |
| 3,300,401 | 1/1967 | Sontheimer et al. | 210/10 X |
| 3,533,775 | 10/1970 | Brown | 71/13 X |
| 3,579,320 | 5/1971 | Pesses | 71/9 |
| 3,736,111 | 5/1973 | Gardner et al. | 71/9 X |

FOREIGN PATENT DOCUMENTS

| | | | |
|---|---|---|---|
| 925,485 | 5/1963 | United Kingdom | 71/12 |

Primary Examiner—Wilbur L. Bascomb, Jr.
Assistant Examiner—Robert H. Spitzer
Attorney, Agent, or Firm—Richard Whiting

[57] ABSTRACT

A process for recycling raw sewage and unsorted solid waste by adding the solids removed from sewage to ground unsorted waste forming a sludge, treating the sludge first anaerobically, sterilizing the anaerobically treated sludge, forming the sludge into a slurry, separating the biodegradable from the non-biodegradable material in the slurry by aerobic fermentation, composting the biodegradable material in batches, curing the compost under control conditions to stabilize its fertilizing properties and classifying the biodegradable and non-biodegradable material to provide useable products. The colloidal raw sewage liquor remaining after separation of the sewage solids is converted into pure water.

29 Claims, 4 Drawing Figures

PROCESS FOR SEPARATING AND CONVERTING WASTE INTO USEABLE PRODUCTS

This is a continuation of application Ser. No. 462,132, filed Apr. 18, 1974, now abandoned, which is a division of application Ser. No. 343,855, filed Mar. 22, 1973, now U.S. Pat. No. 3,847,803, granted Nov. 12, 1974.

The present invention relates to waste conversion, and more particularly to a process for recycling waste in which unsorted waste is separated into biodegradeable and non-biodegradeable material. The biodegradeable material is composted in batches and the non-biodegradeable material is classified.

Numerous processes have been proposed for waste conversion. Most of these processes have sought to attain waste conversion by a continuous process or through the use of windrowing. Biodegradeables and non-biodegradeables are presently separated manually or by the use of fluid beds. These known methods of separation have not been satisfactory. Further, known composting processes have been unsatisfactory in attaining a consistent and stable product. The products resulting from known processes are inconsistent and unstable, presenting marketing difficulties. (By unstable it is meant that the products will absorb nitrogen from living things. In contrast, stable composted products will not absorb nitrogen from living things but will provide nitrogen for their growth.)

It is an object of the present invention to provide a process for completely recycling unsorted waste, which may include all the components present in garbage and sewage, to convert it into useable products.

It is a further oject of the present invention to provide a process capable of batch-wise treatment of waste.

It is a further object of the present invention to provide a process for efficiently separating biodegradeable and non-biodegradeable material.

It is a further object of the present invention to provide a process capable of composting biodegradeable waste to form consistent and stable product.

It is a further object of the present invention to provide an odorless recycling process capable of use in an urban environment.

It is a further object of the present invention to provide an integrated recycling process having discrete phases at the end of which partially treated material can be withdrawn, if desired, and applied to the next phase at a later date.

It is a still further object to provide a recycling process capable of treating and purifying sewage without the addition of chemical coagulants.

Other objects, aspects and advantages of the present invention will be apparent when the detailed description is considered with the drawing.

Briefly, the recycling process of the present invention includes the steps of grinding the unsorted waste material, treating this material anaerobically to soften the biodegradeable waste to hasten and improve subsequent aerobic decomposition, sterilizing the anaerobically treated waste to purify it, delumping the sterilized waste, forming the sterilized waste into a slurry, separating the waste material into biodegradeable and non-biodegradeable material by fermentation, gravity, and filtration, forming the biodegradeable material into a cake, delumping and oxidizing it, treating the biodegradeable material aerobically in batches in the presence of potassium and phosphorus products, and curing the aerobically treated material. The curing or cured material may be innoculated with nitrogen as Azotobacter or other nitrogen fixing bacteria or algae to form fertilizer. Advantageously sewage solids which are separated from the raw sewage may be utilized in this process. The remaining colloidal raw sewage liquor is treated batch-wise with aerobic bacteria, air, oxygen and ozone to provide pure water. The present invention is illustrated with the following drawing in which:

Figure 1:
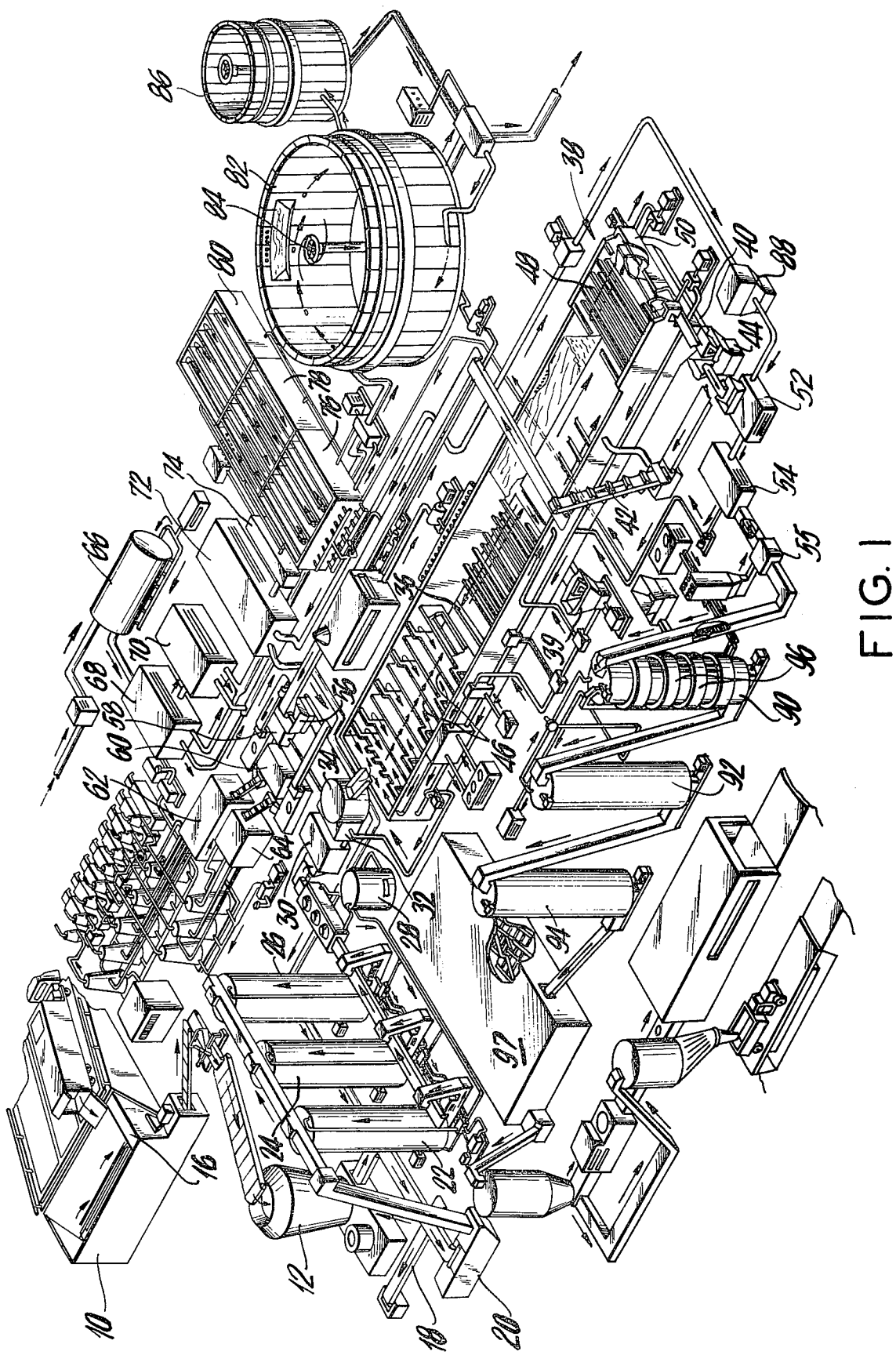
FIG. 1 is a perspective view of the recycling process of the present invention.

Referring to FIG. 1, the process of the present invention is illustrated. The process includes biological degradation, micro-biological and mechanical separation, and classification of non-biodegradeable material. Apparatus for carrying out the process of the present invention is available commercially, and generally will only require minor modification for adaptation to the process of the present invention.

To facilitate in describing the process of the presented invention, it may be viewed broadly as embracing five interrelated operations:

b 1. Preparation,
2. Separation of biodegradeable and nonbiodegradeable solids,
3. Extraction of Water,
4. Finishing, and
5. Classifying materials.

The preparation operation includes:
a. Weighing and receiving solid wastes,
b. Primary coarse grinding,
c. Blending solid wastes and sewage solids,
d. Secondary grinding to further reduce particle size,
e. Anaerobic predigestion of biodegradeables while still mixed with non-biodegradeables,
f. Sterilization,
g. Delumping and aerating, and
h. Forming the sterilized waste into a slurry.

The solids separation operation includes:
a. floatation toward the discharge end of a separation tank under biological fermentation of biodegradeables, assisted with finely entrained air, oxygen and ozone.
b. precipitation
c. settling
d. filtration of non-biodegradeables and any biodegradeables present in the slurry that have not settled or fermented.

The extraction of water operation includes:
a. dewatering of biodegradables
b. drying of non-biodegradeables The finishing operation includes:
a. mixing and blending of additive with the dewatered biodegradeable particles
b. composting, and
c. curing.

The composting operation includes batch-wise treatment of the biodegradeable material in three stages, each of approximately 1 day duration. The composted material is conveyed to a curing area where it remains until the carbon to nitrogen ratio is approximately 20:1. The cured material is pelletized and bagged, or stored in bulk, for shipment.

The classifying operation separates the metals, glass, bones, plastics, building rubble, etc.

Figure 2:
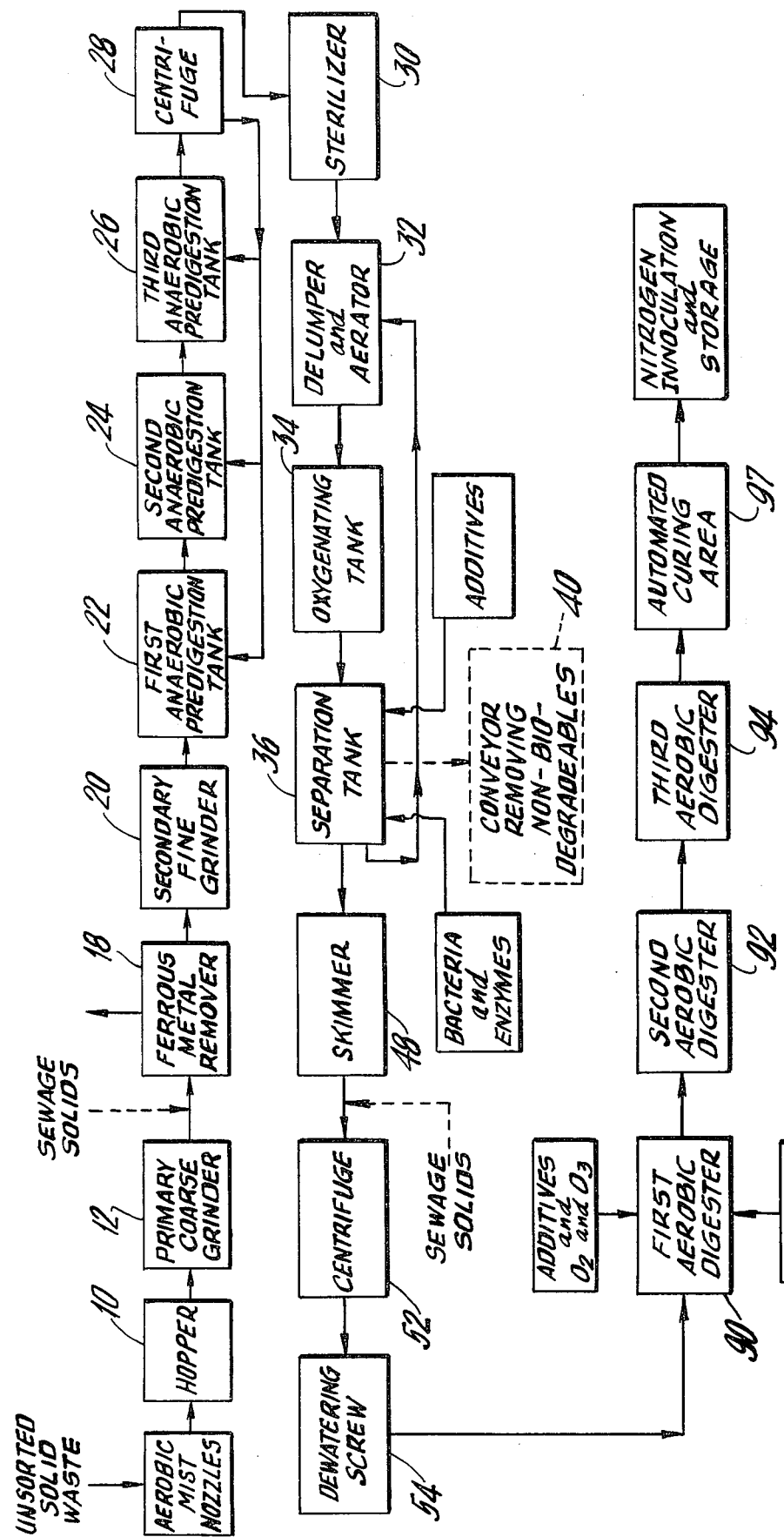
FIG. 2 is a block diagram showing generally the steps used in the preparation and separation of biodegradeable and non-biodegradeable waste, and the composting of the biodegradeable waste.

Referring also to FIG. 2, initially, the unsorted solid waste is transmitted to a receiving hopper 10 by a truck. The unsorted waste and truck may be advantageously sprayed with an aerobicically activated mist to deodorize and clean. The aerobic mist suppresses odors and contaminants an initiates digestion of the biodegradables. The aerobic mist also aids in preventing explosions which frequently result from the grinding of organic matter. The unsorted solid waste is then conveyed to a primary coarse grinder 12 where the solid waste is reduced to particles of approximately 3 to 3½ inches. A leveling apparatus 16 may be advantageously installed above the exit in the receiving hopper 10 to level and distribute the load evenly across the useable width of the conveyor belt to prevent overloading of the conveyors and coarse grinder 12.

At the primary grinder 12 articles which are oversized or too hard to grind e.g. engine blocks or tool steel, are separated and diverted, e.g., by a tipping device (not shown) that actuates an electromagnet to divert heavy ferrous articles, for additional processing or released to appropriate markets.

The ground unsorted waste exiting from the primary grinder 12 may be advantageously blended with sewage solids (sludge) separated from raw sewage. This blend is exposed to a ferrous magnetic metal remover 18. The blend of ground solid waste and sewage solids is conveyed to a secondary grinder 20 where it is reduced to fine particles size of approximately ¼ to ⅜. The blend of finely ground solid wastes and solid sewage if then conveyed to one of three anaerobic predigestion tanks 22, 24 or 26 where it is held for approximately three days under controlled conditions of moisture and temperature to optimize the conditions for anacrobic decomposition. The dwell time of the blended waste in the predigestion tanks 22, 24 or 26 should not extend beyond 8 days, otherwise methane gas will be produced. Ultrasonic waves of a predetermined frequency and duration are applied to the digesting material to enhance the anaerobic germination process.

When the waste material has undergone sufficient anaerobic decomposition, i.e., after approximately three days, it is fed to a conventional centrifuge 28. The resulting effluent liquid is decanted and recycled back to the predigestion tanks 22, 24 and 26. The colonies of anaerobic bacteria developed in the predigestion tanks 22, 24 and 26 are utilized to initiate and further accelerate the decomposition of subsequent batches of waste and the effluent liquid contributes to the moisture content of each batch. p After centrifuging, the partially dewatered predigested waste remaining has a moisture content of approximately 60 to 70. This partially dewatered material is conveyed to a sterilizer 30 where ozone is injected and superheated steam is forced into and through the predigested waste to sanitize and disinfect it. Ultrasonic and/or infrasonic waves of predetermined wave length and frequency may also be advantageously employed with or without the superheated steam to kill the anaerobic bacteria and to reduce the ozone present to oxygen.

With ozone injection it is desirable to place the batch of predigested waste under vacuum so that upon injection the ozone will completely permeate the mass of material. A sufficient vacuum will aid in destroying the anerobic bacteria.

The anaerobic treatment and subsequent sterilization prepares the waste for immediate aerobic digestion (fermentation). The sterilized waste is transmitted to a delumper or tertiary find grinder and aerator 32 from which it is transmitted to any oxygenating tank 34 where it is held after the initiation of the aerobic decomposition.

A separation tank 36 receives the predigested sterilized, delumped, and oxidized waste which is diluted to form a slurry. (The term slurry is used in this application to mean a movable mass having a maximum of approximately 6% solids.) Initially, the separation tank 36 includes an aqueous liquid whose pH is adjusted to between 6.8 and 7.6, and which contains colonies of aerobic bacteria and enzymes to seed the incoming slurry. A controlled portion of the filtered liquor exiting from the separation tank 36 is fed back or recycled to the delumper 32 to provide the proper degree of saturation of the pre-digested and sterilized waste to form the slurry. This liquor initiates the growth of aerobic bacteria in the oxygenating tank 34 as it conveys innoculants such as bacteria, alkalizing, acidifying or oxidizing agents present in the aqueous liquid of the separation tank 36 to the delumper 32. Further, the recycled liquor which is fed back into the delumper 32 may receive additional innoculants of facultative aerobics and enzymes which increase the aerobic decomposition. Since the anaerobically treated predigested waste tends to become acidic, a pH probe and attendant instrumentation injection, and metering equipment regulate the addition of lime, limestone or potassium products to the waste slurry as it is fed into the separation tank 36.

In the separation tank 36, the biodegradeables are physically and microbiologically separated from metal, glass, plastic, sand, grit, and any other non-biodegradeable material. Depending upon the level of carbon dioxide development and oxygen demand, the following materials may be added to the separation tank 36; molasses wood ash, potassium products ammonia, peroxides, and the like.

Fermentation causes the biodegradeable material to rise to the surface of the slurry as the non-biodegradeable material is induced by gravity to settle out. Temperature control devices are included to initially keep the temperature in the tank 36 below 103° F. until complete decomposition of the lignins and celluloses.

A single separation tank 36 is capable of processing a daily input of approximately 50 tons of waste. The separation tank 36 is set into or built above ground and is constructed of coated metal or bacterially resistant concrete with an epoxy coating. A plurality of these separation tanks 36 may be employed in parallel as required to handle the daily volume of unsorted waste.

At the bottom of the tank 36 is a drag or similar conveyor which operates at a slow speed, e.g., from 50 to 100 feet per hour, which is automatically adjusted to the weight of the settled non-biodegradeables. The drag conveyor moves the settled non-biodegradeables toward the discharge end 38 of the tank 36. After traveling a predetermined distance, the heavier particles which have dropped out during the first half of the separation treatment are scraped into a recessed pit where a screw conveyor removes them through a port in the tank 36. This discharged material may include a small percentage of lumped biodegradeables that have settled to the bottom of the tank 36. Therefore, the discharged material is fed into a Gorator pump-grinder 39, available commercially from Dorr-Oliver Inc., and the resulting effluent liquor is fed back into the separation tank 36 just beyond the point at which the discharged material is removed.

After removal and regrinding of the discharged material, the non-biodegradeables which were sufficiently ground at the secondary grinder 20, e.g., metal foil, and which may have remained in suspension over the first half of the tank 36 will gradually settle to the floor of the tank 36. The drag conveyor gathers and carries all of these ground non-biodegradeable particles along the bottom of the tank 36 into a screw conveyor 40 at the discharge end 38. This discharged material is delivered to a perforated-bucket elevator 42. The entrained liquid is allowed to drain back into the separation tank 36.

The slurry is made to flow through the tank 36 by suction at selectively variable depths by Gorator pump-grinders (only one is indicated at 44) or other pumps capable of handling slurries composed of particles of varying sizes. These pumps are placed near the corners of the tank at the discharge end 38. The slurry is continuously recirculated and monitored to control its temperature, pH, oxygen demand, and carbon dioxide production for optimum biological activity.

If the slurry tends to become too acidic, an alkalizing agent, e.g., lime, limestone, etc., in pulverized form, is metered into the tank 36. Conversely, the tendency toward too alkaline a slurry is alleviated by the addition of sulfur dioxide gas or powdered sulfur. The pH of the slurry is controlled to within 6.8 to 7.6. The temperature of the slurry is maintained within limits most favorable to the growth of micro-organisms by the use of heat exhangers, which may be placed in contact with the recirculating pipes, injection of cool water, or steam. Diverting or streamsplitting valves automatically regulate the flow of the recycled slurry liquor to cause it to enter or bypass the delumper 32.

The fermenting biodegradeable particles become surrounded by minute bubbles of air, oxygen and carbon dioxide, and rise to the surface of the slurry, where the froth or spongy mass accumulates. Larger size gas bubbles are introduced over approximately the last third of the tank 36 to add buoyancy to the fermenting biodegradeable particles to assist in bringing them to the surface of the slurry. The spongy mass is carried slowly to the discharge end 38 of the tank 36 where it collects as a coagulum on the surface of the slurry for removal.

To retard the flow of the slurry and extend the reaction period of the enzymes and aerobic bacteria, a plurality of baffles 46 are positioned in the tank 36, transversely to the direction of movement of the slurry. A distance of approximately 1½ to 2 feet is provided between the top of the baffle 46 and the top of the walls of the tank 36 for the collection of the froth which contains the fermented biodegradeable material.

To increase the action of the aerobic bacteria, enzymes, air, oxygen, ozone, or anhydrous ammonia are introduced into the slurry at predetermined depths and locations. The gas introducing installation includes a manifold with connecting pipes set along the lower edge of or between the baffles 46. The pipes include ultrasonic nozzles which permeate the slurry with micron and larger size air and oxygenating bubbles to create a more favorable environment for rapid bacterial growth. Ultrasonic sound generators are advantageously located at various positions along the length of the tank 36, beneath the surface of the slurry, to stimulate the growth of the aerobic bacteria.

The end wall of the tank 36 is advantageously made lower than the other walls of the tank. A skimmer 48 at the discharge end 38 removes the froth from the slurry and discharges it into a receiving trough 50 adjacent the end of the tank 36. The decomposed biodegradeables which are deposited in the trough 50 are removed by a screw conveyor and conveyed to a dewatering centrifuge 52 which in turn feeds a rotating disc dewatering screw 54.

Figure 3:
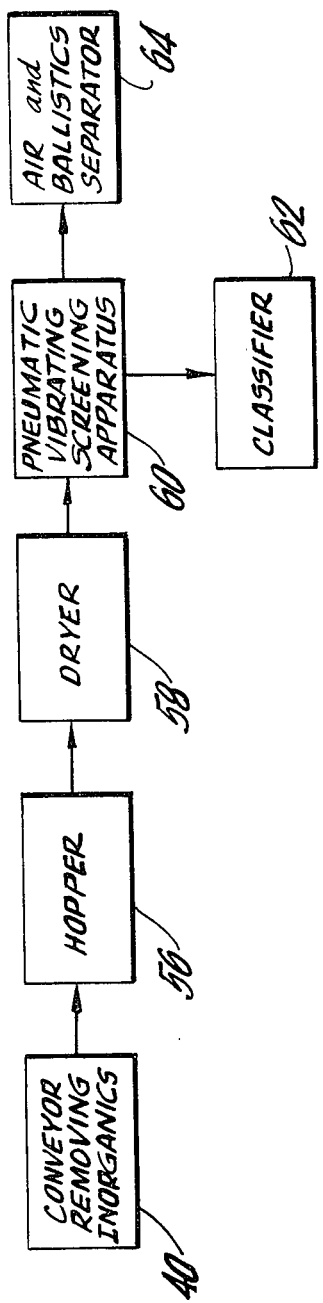
FIG. 3 is a block diagram showing generally the steps used in the classification of the separated inorganic waste.

Referring also to FIG. 3, the removed non-biodegradeable material is conveyed by the bucket elevator 42 into a collecting hopper 56, from which the material is fed onto a belt conveyor in controlled quantities. The non-biodegradeables, such as metals, building rubble, sand, grit, ground glass, and plastics are conveyed to a dryer 58 to reduce the moisture content. This dessicated non-biodegradeable material is conveyed to pneumatic vibrating screening apparatus 60, which sorts material according to specific gravity and particle size. The accepted material is transmitted to a classifier 62. The rejected granulate is put through an air and ballistics separator 64 in which the heavier particles are separated by buoyancy and gravity, while the lighter particles, e.g., plastic and glass, are conveyed to a further station for final separation and recovery. All of the separated and recovered materials are diverted to individual collection bins from which they may be briquetted or dispensed in bulk.

Figure 4:
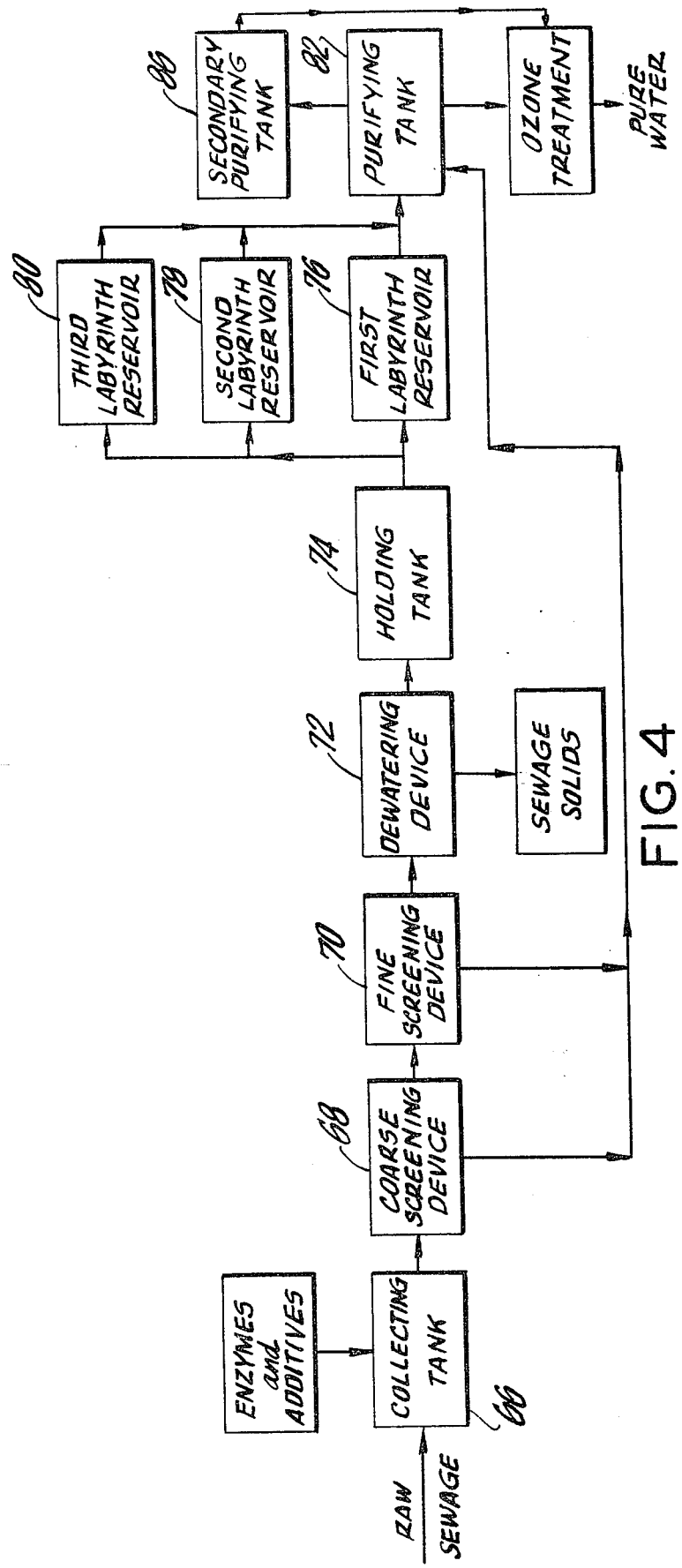
FIG. 4 is a block diagram showing generally the steps used in sewage treatment.

Referring also to FIG. 4, raw sewage to be treated is pumped into at least one collecting tank 66 of approximately 25,000 gallon capacity. Enzymes and other additives, e.g., peroxides, oxygen, etc. are injected into this tank and the pH and temperature are monitored and adjusted to stimulate the growth of the aerobic bacteria and enzymes, and to deodorize this mass. From this tank 66, the treated sewage is pumped to the first of two screening devices 68 and 70. The first screening device 68 removes and diverts coarse solids from the raw sewage. The second screening device 70 removes finer particles. The sewage solids or sludge resulting from the screening devices 68 and 70 is conjoined and conveyed to a dewatering device 72 and from here to the secondary grinder 20 where it is combined with the unsorted solids prior to transmission to the anaerobic production tanks 22, 24, or 26. This sewage sludge is advantageously subjected to the ferrous metal remover 18.

The effluent sewage liquor exiting from the dewatering device 72 is pumped into a holding tank 74 and there into the first of three or more sewage labyrinth reservoirs 76, 78 and 80, as demanded. (Multiple parallel reservoirs can be used to accommodate a greater volume of sewage.) One reservoir is filling, another reservoir is building up the bacterial count, and the remaining reservoir is emptying into a purifying tank 82. The efluent sewage liquor is the labyrinth reservoir in which the bactorial count is building up is constantly monitored for acidity or alkalinity as well as for temperature and oxygen content and supplied with other materials as needed, while the bacterial count is increased to its maximum.

The effluent sewage liquor from the holding tank 74 flows slowly into one of the labyrinth reservoirs 76, 78 or 80 where it is aerated with micron size gas bubbles in a manner similar to the aeration in the separation tank 36. (Pressurized air, oxygen or ozone is injected through ultrasonic nozzles as required. Ozone is used in small quantities to trigger the growth of the aerobic bacteria.)

The effluent sewage liquor remains as a captive batch in the reservoir in which the bacterial count is building up until the bacterial count reaches a predetermined level. The retention time of the liquor in the reservoirs 76, 78 or 80 is determined by the build-up of bacteria and is generally accomplished by the build-up of bacterial and is generally accomplished within one day, after which the aerated and bacterially active effluent sewage liquor is drawn off from the discharge port of the emptying reservoir to seed the ensuing operation in the purifying tank 82.

Each purifying tank 82, a plurality may be used, has a capacity of approximately 250,000 gallons. The colloidal raw sewage liquor from the solids screening devices 68 and 70 and a metered amount of the liquor from the emptying labyrinth reservoir 76, 78, or 80 are introduced into the purifying tank 92 by injection causing a vortical which creates an eddy which is augmented by the proper directional infusion of pressurized, air oxygen, ozone, or a mixture thereof, introducing a high degree of bacterial activity throughout the blended liquor. The sewage liquor from the emptying reservoir has a higher beneficial bacterial count than the colloidal raw sewage liquor and greatly increases the desired bacterial activity in the purifying tank 82, thereby reducing the required volume in the tank 82.

The purified liquor (water) is withdrawn through a center standpipe outlet 84 in the tank 82. This liquor is monitored to indicate any deviation in its purity and clarity. If a deviation in purity is detected a recycle diversion valve is activated and the impure water is transmitted to a secondary purifying tank 86 of smaller volume. Simultaneously, with the detection of impure water in the purifying tank 82, the volume of oxygen and ozone is increased. The water removed from the purifying tanks 82 or 86 is subjected to a final test to verify that it meets existing water codes before being put into a receiving body of water. The resulting water is treated with the required amount of grams of ozone to maintain the B.O.D. at required level.

No chemical coagulants are added to the raw sewage so that the resulting water is of the highest purity. Further, no solids are discharged by the purifying tanks 82 or 86, since they are consumed by the aerobic bacteria and returned to the air.

Alternatively, instead of combining the removed sewage solids with the ground solid waste prior to secondary grinding, the sewage solids may be sprayed with an aerobic solution and pumped through a Gorator pump grinder 88. The pulverised sewage sludge is then blended with the biodegradeable froth resulting from the separation tank 36 prior to dewatering. If overload conditions occur at the predigestion tanks 22, 24 and 26, this alternative approach may be used.

The resulting blending of sewage solids and biodegradeablefroth is thoroughly mixed and analyzed by suitable instrumentation. Additives are injected to bring the composition of the blend to within the desired parameters for efficient aerobic composting. This blend is then transferred to a centrifuge 52 and dewatering screw or press 54 where the moisture content of the blend is reduced to 55%. The effluent liquor resulting from the dewatering devices 52 and 54 is collected and returned to the separation tank 36 or the labyrinth reservoirs 76, 78 or 80.

The dewatered biodegradeable froth (with or without the sewage solids) forms a cake which is crumbled and fragmented by a delumper 55. The delumped biodegradeable material is now ready for composting and is transferred into the first of a series of three aerobic digesters 90, 92 and 94, each having approximately a 1 day cycle. (It should be apparent that more groups of these digesters may be arranged in parallel with the first group of digesters 90, 92 and 94 as demand requires.) Additives required to stimulate active bacterial growth, such as selected bacteria, molasses, wood ash, and lime, are added as required to the first degester 90.

Pulverized, soft coal, preferably finely divided lignite or ground tailings of lignite, as they occur mixed with rock, is advantageously blended with the biodegradeable material in the first digester 90. The first addition of coal should include about 5% of the total amount of coal to be injected in order to stimulate the initial growth of mutations of bacteria in sufficient quantity to rapidly break down the remainder of the coal when it is added. (It may be desirable to provide a separate processing unit for rapid breeding of these bacterial mutations.) The remainder of the coal is added after the batch of biodegradeable material has been composting for a sufficient length of time so that the count of the bacterial mutations is at a maximum. To increase the reaction speed the coal may be introduced under vacuum conditions. The coal may occupy as much as 30% of the volume of the batch in the first of digester 90.

The coal contributes highly valuable trace minerals to the biodegradeable material. It also darkens the material considerably to increase the heat adsorption qualities of the soil upon which the finished fertilizing compost is used. Carbon black in lesser quantity may be substituted for coal to darken this end product.

Phosphorus and potassium products are also blended into the material in the first digester 90. The phosphorus and potassium products are introduced at the most voracious period of the bacterial growth so as to be readily assimilated. The resulting material contains chelated or organically held phosphorus and potassium so that the nutrients are more available to plants as an organic product and will not overtreat or "burn" if applied excessively. Trace minerals are also metered into the material as needed.

The degesters 90, 92 and 94 are efficient bacterial incubators and utilize temperature control to provide extremely rapid bacterial assimilation of the components of the bio-degradeable material.

The digesters 90, 92 and 94 promote rapid aerobic bacterial decomposition and, by properly timing their filling and emptying, the product can be kept consistent. The tanks are approximately 10 feet in diameter by 30 feet in height, with a spiral mixing auger installed vertically and extending almost the entire length of the tanks, such tanks are available commercially from Sprout Waldron Corp.

The mixing auger is enclosed in a centered inner tube. A large ribbon-type conveying screw is rotated in the center of the tube and serves to convey the lower portion of the batch to the top where it is subjected to an atmosphere of oxidizing, nitrifying gases, and moisture to enhance decomposition. The material in the lower portion is fed into the vertical screw. The mid and upper portions of the batch are moved upward and fall toward the bottom of the digesters 90, 92 and 94, and are eventually conveyed back to the top by the spiral auger. This agitation intermittently turns the batches of digesting biodegradeable material, allowing string-like fungi to grow during the rest periods, and subjects the material to additive and developing gases, such as carbon dioxide, that assist the decomposition and add value to the end product.

The first digester tank 90 is jacketed internally at the auger and externally in order to accurately control the temperature of the first batch. An ethylene glycol solution or the equivalent is circulated through the jacket 96 as the heat transfer medium.

Initially, it is advantageous to extend the life span of the bacteria that break down the cellulosic and lignin components of the biodegradeables. To accomplish this, the temperature of the first batch should not exceed 103° F. until digestion of these two components is complete. Thereafter, the heat which is generated by the thermophiles can be used to increase the temperature of the first batch. If the temperature in the first digester 90 is increased to approximately 125° F. after completion of the decomposition of the cellulose and lignin the remainder of the bacteriological decomposition process will be accelerated. As the temperature of the first batch normally increases beyond 125° F. and upwardly to approximately 175° F., and on rare occasions tends to further increase above this level, the additional heat should be dissipated by the heat transfer jacket 96. A temperature above 180° F., especially with efficient oxygenation, will destroy most of the colonies of beneficial soil bacteria which should be retained in the finished compost material.

The temperatures of the first batch is monitored and controlled until the biodegradeable material is capable of maintaining a constant temperature of approximately 170° F. by internal thermal activity alone. This temperature is maintained for a period of approximately one day in each of the last two digesters 92 and 94. After this period, the material is conveyed to an automated curing area 97.

Several operations are performed simultaneously on the biodegradeable material present in the digesters 90, 92 and 94, in addition to temperature control, to optimize the composing of this material.

These features include:
1. The use of a partial vacuum, particularly in the first digester 90, in part, to distribute gases such as oxygen, ozone and air quickly throughout the batch and ultimately reject them.
2. Application of an aeration system to all of the digesters 90, 92, 94.
3. Intermittent agitation, tumbling and resting of the material to provide the optimum degree of contact and interaction. During the rest periods an opportunity is provided for fungi to grow throughout the material.
4. Ultrasonic sound waves to stimulate bacterial growth;
5. Control of the time for holding and transferring the material from digester to digester;
6. The systematic injection of additives as monitoring instruments indicate a need;
7. The initiation of bacterial activity by seeding with aerobic bacteria; and
8. The acceptance or rejection of batches that need special treatment or that should be further processed;
9. The exposure of the batches to artificial light, which is substantially the equivalent of sunlight, by a special tungsten arc housed in a quartz bulb. The tungsten arc bulb acts through a quartz or potassium glass porthole in the digesters 90, 92 and 94.

The first digester 90 is equipped with adequate seals on the input and output ports, as well as on the pipes and valves, to allow a vacuum of between approximately 2 inches and 10 inches of mercury to be drawn to expedite bacterial activity and the resulting decomposition. The partial vacuum is applied at a predetermined time in the cycle of bacterial activity, specifically, at the time of the first internal temperature rise caused by the bacterial activity. The partial vacuum aids in the decomposition by increasing the growth of the bacterial mutations.

Air, oxygen, ozone, or a blend thereof, is injected into the first digester 90 during the various periods of bacterial activity. The first injection is made when the internal temperature is between 80° to 113° F., another injection is made when the internal temperature is between 115° and 135° F. to maintain bacterial growth at optimum efficiency. Injection is aided by the vacuum which draws the gases in and distributes them efficiently throughout the mass.

All of the digesters 90, 92 and 94 are equipped with aeration ports and nozzles to inject air, oxygen, ozone, or a blend thereof, into the particular digester as demanded by the condition of the batch being processed.

Steam at various temperatures can also be introduced into any of the three batches to sanitize any batch which may have become overly active, to stimulate bacterial action already in progress, or to add moisture in order to provide a more humid environment for the growth of the aerobic bacteria.

To further promote the growth and multiplication of bacteria, ultrasonic generators may be positioned on each digester 90, 92 and 94 and operated at selected wave lengths.

Each batch is subjected to individual treatment. Unresponsive, or otherwise undesirable batches are detected, immunized and transformed for further treatment, or expelled from the system and recycled to a preceeding point in the process for additional treatment. Small portions of batches having particularly high bacterial activity may be retained for a short period in a separate holding bin (not shown) for utilization as needed in seeding subsequent batches of low activity.

By interlocking a timed cycle with the degree of heat rise, oxygen demand and carbon dioxide development, the rate of decomposition is monitored and the finished processing cycle time can be calebrated to trigger the discharge of material either to the next digester or for rejection to a holding area. This interlocking of conditions also controls the injection of processing materials as previously described to maintain or expedite the processing cycles.

The treated and fortified biodegradeable material which is discharged from the digester 94 is highly activated bacteriogically, but has not matured sufficiently to be used as a soil condition because the carbon to nitrogen ratio (C/N) is inadequate. In order to provide the desired C/N ratio, a curing or maturing period is necessary. The composted material is transferred to the curing area 97 where the nitrogen fixing bacteria present in the composted material is given sufficient time to achieve the desired ratio. When the carbon to nitrogen ratio is between 17/1 and 22/1 the curing is complete. Also, this curing period allows the chemical additives to complete their chelating or assimilation by the aerobic bacteria.

The curing area 97 includes a series of enclosed, inclined units that contain cleated belt conveyors. The velocity of the belt conveyors is established by instruments which monitor and control the temperature of the curing area 97. Oxygen and ozone may be injected into this curing area 97 to assist the curing action.

A solution of nitrogen fixing bacteria, e.g., Azotobacter, is sprayed on the finished product in the proper proportion to add the required nitrogen and plant growth factor. The finished product is then stored in bulk or it is pelletized and packaged for shipment.

It should be understood by those skilled in the art that various modifications may be made in the present invention without departing from the spirit and scope thereof, as described in the specification and defined in the appended claims.

What is claimed is:

1. A process for converting waste comprising biodegradeable and non-biodegradeable materials into useable products, comprising the steps of:
   grinding unsorted waste into particulate form;
   anaerobically treating the unsorted waste particles;
   sterilizing the anaerobically treated particles;
   mixing the sterilized particles with an aerobic and enzyme activated liquid to form a slurry;
   inducing the slurry to flow;
   controlling the temperature and pH of the moving slurry to cause fermentation;
   permeating the moving slurry with oxygenating gases to aid in fermentation and in causing the biodegradeable material to rise to the surface of the moving slurry and form a froth;
   removing the biodegradeable froth from the top of the slurry;
   collecting the non-biodegradeable material which settles out;
   adjusting the moisture content of the biodegradeable material to approximately 55%;
   separating the biodegradeable matter into batches and enclosing the batches in individual vessels;
   aerobically treating the biodegradeable matter thus formed in batches thereby raising the internal temperature thereof;
   controlling the environment to stimulate active aerobic bacterial growth in the batches; and
   curing the decomposing material so that the carbon to nitrogen ratio becomes established at between about 17/1 and about 22/1.

2. The process as claimed in claim 1 including the steps of:
   adding sewage solids to the ground unsorted waste prior to anaerobic treatment;
   dewatering the anaerobically treated material prior to sterilization.

3. The process as claimed in claim 1 including the step of:
   further grinding the unsorted waste, after the first guiding step, to fine particulate form.

4. The process as claimed in claim 1 including the step of:
   delumping the particulate waste after sterilization.

5. The process as claimed in claim 4 including the step of:
   aerating simultaneously with delumping.

6. The process as claimed in claim 1 including the step of:
   spraying the unsorted waste with an aerobic mist prior to grinding.

7. The process as claimed in claim 1 wherein:
   the anaerobic treatment is conducted for approximately three days.

8. The process as claimed in claim 1 including the steps of:
   dewatering the collected non-biodegradeables;
   recirculating the effluent liquor resulting from dewatering of the non-biodegradeables for mixture with the slurry.

9. The process as claimed in claim 1 including the step of:
   recirculating the filtered effluent liquor after removal of the biodegradeable froth and non-biodegradeable material from the slurry for mixing with the sterilized waste particles.

10. The process as claimed in claim 1 wherein:
    the oxygenating gases are introduced at approximately micron size.

11. The process as claimed in claim 1 wherein:
    the temperature of the moving aerobic slurry is initially controlled to remain below approximately 103° F. until the decomposition of the lignins and cellulose is completed.

12. The process as claimed in claim 1 including the step of:
    retarding the movement of the slurry to extend the reaction period of the enzymes and aerobic bacteria.

13. The process as claimed in claim 1 including the step of:
    stimulating the growth of the aerobic bacteria by applying ultrasonic sound waves to the slurry.

14. The process as claimed in claim 1 wherein:
    sterilization is accomplished by superheated steam.

15. The process as claimed in claim 1 wherein:
    sterilization is accomplished by ultransonic waves.

16. The process as claimed in claim 1 wherein:
    sterilization is accomplished by infrasonic waves.

17. The process as claimed in claim 1 including the steps of:
    placing the particulate waste under vacuum during sterilization;
    adding ozone during sterilization.

18. The process as claimed in claim 1 including the step of:
    adding coal to the first batch in two phases, the first phase including approximately 5% of the total to be added to stimulate the initial growth of mutations, the remaining coal being added in the second phase after the count of the mutations is at a maximum.

19. The process as claimed in claim 1 including the step of:
    blending phosphorous and potassium products into the first batch.

20. The process as claimed in claim 1 including the step of:
    intermittently agitating the batches.

21. The process as claimed in claim 1 including the step of:
    exposing the batches to light which is substantially equivalent to sunlight.

22. The process as claimed in claim 1 including the steps of:
    initially controlling the temperature of the first batch to below approximately 103° F. until decomposition of the cellulosic and lignin components of the biodegradeable particulate matter is completed;

increasing the temperature of the first batch to approximately 125° F. after decomposition of the cellulose and lignin is completed;

cooling the batch to below 180° F. should its temperature tend to rise to this level.

23. The process as claimed in claim 1 including the step of:

controlling the environment of the first batch until it is capable by bacterial activity alone of maintaining a constant temperature of approximately 170° F.;

transferring the first batch to a second station where it is held for a period of approximately one day at a temperature of approximately 170° F.;

transferring the biodegradeable particulate matter from the second station to a third station where it is held for a period of approximately one day at a temperature of approximately 170° F.

24. The process as claimed in claim 1 including the step of:

aerating the batches.

25. The process as claimed in claim 1 including the step of:

ultransonically treating the batches to stimulate bacterial growth.

26. The process as claimed in claim 1 including the step of:

applying a partial vacuum to the first batch at the time of the first internal rise in temperature of the batch.

27. The process as claimed in claim 1 including the steps of:

injecting a first volume of oxygenating gases into th first batch when the internal temperature is between about 80° F. and about 113° F.;

injecting a second volume of oxygenating gases into the first batch when the internal temperature is between about 115° and about 135° F.

28. The process as claimed in claim 1 including the step of:

mixing ground sewage solids with the biodegradeable froth removed from the slurry.

29. The process as claimed in claim 28 including the step of:

spraying at least a portion of the sewage solids with an aerobic solution prior to grinding of the sewage solids.

* * * * *

UNITED STATES PATENT AND TRADEMARK OFFICE
CERTIFICATE OF CORRECTION

PATENT NO. : 4,053,394
DATED : October 11, 1977
INVENTOR(S) : Pliny Fisk

It is certified that error appears in the above-identified patent and that said Letters Patent are hereby corrected as shown below:

Column 1, line 33, "oject" should be--object--.

Column 1, line 40, after "form" insert--a--.

Column 2, line 31, before "1" cancel--b--.

Column 2, line 61, "additive" should be--additives--.

Column 3, line 34, "particles" should be--particle--.

Column 3, line 34, change "1/4 to 3/8" to--1/4" to 3/8"--.

Column 3, line 35, "if" should be--is--.

Column 3, line 39, "anacrobic" should be--anaerobic--.

Column 3, line 55, after "batch." cancel--p--.

Column 3, line 57, change "60 to 70" to--60% to 70%--.

Column 5, line 55, "baffle" should be--baffles--.

Column 7, lines 8 and 9, after "accomplished" delete--by
   the build-up of bacterial and is generally accomplished--

Column 7, line 19, "92" should be--82--.

Column 7, line 20, after "vortical" insert--action--.

Column 8, line 12, "degester" should be--digester--.

UNITED STATES PATENT AND TRADEMARK OFFICE
CERTIFICATE OF CORRECTION

PATENT NO. : 4,053,394
DATED : October 11, 1977
INVENTOR(S) : Pliny Fisk

It is certified that error appears in the above-identified patent and that said Letters Patent are hereby corrected as shown below:

Column 8, line 46, "degesters" should be --digesters--.

Column 9, line 42, "composing" should be --composting--.

Column 10, line 39, "transformed" should be --transferred--.

Column 10, line 58, "condition" should be --conditioner--.

Signed and Sealed this

Thirtieth Day of May 1978

[SEAL]

Attest:

RUTH C. MASON
Attesting Officer

LUTRELLE F. PARKER
Acting Commissioner of Patents and Trademarks